Patented Oct. 13, 1942

2,298,271

UNITED STATES PATENT OFFICE 2,298,271

MANUFACTURE OF MODIFIED ORGANIC ISOCOLLOID MATERIALS

László Auer, East Orange, N. J.

No Drawing. Application June 9, 1941, Serial No. 397,279. In Hungary May 19, 1926

12 Claims. (Cl. 260—407)

This invention relates to the manufacture of modified organic isocolloid materials and it comprises methods of making such modified products from organic isocolloid materials containing a relatively high concentration of dispersed phase, such as partially bodied fatty oils, etc., wherein a minor amount of a modifying agent or polar compound, advantageously an organic polar compound, is colloidally dispersed or dissolved in such organic isocolloid to modify the physical and other properties thereof, such as melting point, viscosity, state of aggregation, solubility, etc., sufficient polar compound being employed to alter one or more of said properties of the organic isocolloid material and said dispersion and modification being usually effected with the aid of heat, in the absence or presence of suitable solvents, and wherein the modified products so obtained are sometimes subsequently vulcanized, emulsified, etc., to further modify their properties; and it also comprises the modified organic isocolloids so obtained, all as more fully hereinafter set forth and as claimed.

In my prior applications, I have described processes for modifying the physical and other properties of organic isocolloids. This application is a continuation in part of my prior applications; the various organic isocolloids and polar compounds or modifying agents and the several procedures disclosed in such applications being useful in the present invention.

This application is in part a continuation of my application Serial No. 188,014 filed January 31, 1938. That application, in turn, is in part a continuation and in part a division of Serial No. 143,786 filed October 23, 1926, now Patent No. 2,189,772, and of the various divisions and continuations thereof, particularly the continuation thereof filed April 30, 1929, Serial No. 359,425, now Patent No. 2,213,944, and of Serial No. 466,587, filed July 8, 1930, now Patent No. 2,106,708.

The said parent application and the continuation and divisions thereof are as follows:

| Serial No.— | Filed | Patent No.— | Issued |
|---|---|---|---|
| 143,786 | Oct. 23, 1926 | 2,189,772 | Feb. 13, 1940 |
| 273,159 | Apr. 26, 1928 | 1,985,230 | Dec. 25, 1934 |
| 273,160 | Apr. 26, 1928 | 1,985,231 | Dec. 25, 1934 |
| 359,424 | Apr. 30, 1929 | 2,007,958 | July 16, 1935 |
| 359,425 | Apr. 30, 1929 | 2,213,944 | Sept. 10, 1940 |
| 359,426 | Apr. 30, 1929 | 1,980,366 | Nov. 13, 1934 |
| 359,427 | Apr. 30, 1929 | 1,957,437 | May 8, 1934 |
| 446,170 | Apr. 21, 1930 | 2,234,949 | Mar. 18, 1941 |
| 446,171 | Apr. 21, 1930 | 1,980,367 | Nov. 13, 1934 |
| 446,172 | Apr. 21, 1930 | 2,213,943 | Sept. 10, 1940 |
| 446,174 | Apr. 21, 1930 | 2,180,342 | Nov. 21, 1939 |
| 466,587 | July 8, 1930 | 2,106,708 | Feb. 1, 1938 |
| 188,014 | Jan. 31, 1938 | | |
| 236,800 | Oct. 24, 1938 | 2,234,545 | Mar. 11, 1941 |
| 305,409 | Nov. 20, 1939 | | |
| 318,650 | Feb. 12, 1940 | | |
| 356,103 | Sept. 9, 1940 | | |
| 383,049 | Mar. 12, 1941 | | |
| 383,339 | Mar. 14, 1941 | | |
| 385,847 | Mar. 29, 1941 | | |

As disclosed in the above copending applications and patents, I have found that by dissolving or colloidally dispersing various modifying agents in organic isocolloid materials, I obtain modified products having altered physical properties, etc., which are useful in the commercial and industrial arts. The modifying agents are employed in minor amounts and are organic and inorganic compounds which are electrolytes or polar compounds capable of influencing the modification of the isocolloid substances. In those applications many illustrative examples of the practice of my generic invention or discovery are disclosed. In most cases, particularly when the polar compound used as the modifying agent is an inorganic salt, the mixture of the organic isocolloid such as a fatty oil, and the modifying agent were heated to relatively high temperatures such as 250° to 350° C. to obtain highly modified products; the heating to such temperatures increasing the concentration of dispersed phase of the isocolloid and causing the polar compound to become associated with the dispersed phase.

The present invention is based upon my further discovery that when an organic isocolloid containing a relatively high concentration of dispersed phase is employed as the starting material in any of my prior processes, the desired modification is more readily and quickly obtained, even at lower temperatures or in a shorter time or both in many cases. In some cases with the dispersed phase in satisfactory concentration in such organic isocolloids, a simple dispersion of the modifying agent therein causes the desired changes in the physical properties of the starting material. That discovery and methods of applying the same are generically and specifically disclosed and claimed in my application Ser. No. 466,587; the present application being in part a division of that application.

That is, by my prior investigations as shown in my earlier applications, I have made important discoveries. I discovered that various oils, such as fatty oils, etc., and many other organic materials, both natural and artificial, are really organic isocolloids. That is, they comprise a dispersion medium and a dispersed phase which are chemically similar. In such isocolloids, the physical properties thereof are in part dependent upon the relation between the phases thereof. Thus two materials having approximately the same chemical composition might have quite different physical properties. I have also discovered that polar compounds are capable of influencing the relations between those phases of these organic isocolloids and that the physical and other properties of these organic isocolloids, such as melting point, viscosity, solubility, film strength, etc., are altered by dispersing or dissolving a polar compound in the organic isocolloid. They impart polarity to the isocolloid system thus modifying it. These generic discoveries and methods of modifying the physical properties of organic isocolloids with polar compounds as the modifying agent, based on those discoveries, are set forth in prior copending applications set forth ante.

As disclosed in those applications, my generic method for modifying the properties of organic isocolloids comprises dissolving or colloidally dispersing a minor amount of a polar compound in the organic isocolloid, the amount of polar compound being sufficient to substantially alter one or more of its properties. Generally from 1 to 30 per cent of the polar compound by weight on the organic isocolloid is used, advantageously from 2 to 10 per cent in most cases, particularly with fatty oils such as linseed oil and the like. Sometimes less than 1 per cent of certain polar compounds gives desirable improvements in the oil. Various methods may be used to disperse the polar compound in the isocolloid to be modified, so long as the polar compound becomes dispersed therein in complete (molecular or colloidal) solution.

In some cases, as disclosed in Serial No. 143,786, the polar compound and organic isocolloid may be mixed cold to produce the modified products. That is, the materials can be simply stirred or agitated together at room temperature, if the polar compound is directly soluble at low temperatures in the organic isocolloid to be modified. Such mixing at room temperature may also be accomplished by the use of appropriate solvents; solvents capable of dissolving both the organic isocolloid and the polar compound used. In such methods, sufficient common solvent to blend the materials into a homogeneous mass may be employed and the solvent subsequently removed by evaporation if desired.

Again, the polar compound and organic isocolloid may be melted together, as also disclosed in Serial No. 143,786 Patent No. 2,189,772. That is, heated to a temperature sufficient to fuse them into a homogeneous mass. Such fusing or melting together, may be employed when the polar compound or organic isocolloid or both are solids which fuse or melt at moderate temperatures and which are readily miscible with each other. In such cases, warming or heating to fusion temperature, advantageously with stirring or agitation, until a homogeneous mass is obtained gives useful products.

Generally, in order to insure complete dissolution or dispersion of the polar compound in the organic isocolloid, the operations should be carried out under the application of heat. The degree of heat required depends on the nature of the isocolloid material being modified and the modifying agent or polar compound used in a given case. In those methods, wherein the mixture is heated to elevated temperatures to disperse those polar compounds which are more difficult to dissolve in certain organic isocolloids, the range of temperatures employed is generally from 100° to 300° C., usually from 200° to 300° C. Only occasionally is a higher temperature necessary, say as high as 350° C. The heat treatment promotes the complete (molecular or colloidal) dissolution of the polar compound in the substance to be treated and modified. In some cases, it is advisable to continue the heat treatment after the dissolution or dispersion of the polar compound is substantially complete. Thus, for instance, when the isocolloid material being modified is a fatty oil and the agent is dispersed in it at 200° C. or above, continued heating produces a fargoing heat-bodying of the oil and in this way it is possible to produce relatively hard, solid products when desired. Such methods are disclosed in my application Serial No. 359,425 and other continuations of Serial No. 143,786, many illustrative examples being given in which both inorganic and organic polar compounds are used as the modifying agents for the organic isocolloids.

Further, as set forth in those applications, I have found that the properties of the products obtained by my methods can be influenced by the nature and physical condition of the gas present in contact with the material undergoing treatment. That is, by varying the pressure the specific nature of the products can be somewhat changed. These processes can be effected under reduced, atmospheric or increased pressure. Sometimes, the mixture of poler compound and organic isocolloid may be heated under increased pressure and then the pressure subsequently released or reduced. This may be advantageously used when solvents are employed as mentioned ante; the solvent being retained at the high pressure and removed when the pressure is released or reduced, that is subsequently removed by distillation from the hot mass. Generally speaking, the rarification of the gas present during the treatment intensifies the actions in these processes. Thus in many cases, the heating is effected under vacuum or reduced pressure. Likewise, the presence of air or other gas somewhat alters the results obtained. When a gas treatment is employed in conjunction with the heating, the gas is usually blown or passed through the heated mixture. For these purposes non-oxidizing gases, such as $SO_2$, $CO_2$, nitrogen, etc., are advantageous. Also the gas may be developed in situ, from compounds such as peroxides, carbonates, sulphides, sulphites and the like, to give the corresponding gas, according to the conditions employed.

Likewise the modifying agent or polar compound may be produced in situ within the organic isocolloid material during the heating, by using compounds which react, under the conditions employed, to form the desired modifying agent.

Also, in modifying these organic isocolloids, true or colloidal solutions of one or more polar compounds or electrolytes in an organic solvent may be used to incorporate them into the substance to be modified.

Having summarized the procedural steps of the methods of practicing my generic invention as disclosed in the said prior applications, the various types of polar compounds advantageous in such methods are next summarized. As stated in Serial No. 143,786 and Serial No. 359,425 and the continuations thereof, the following classes of polar compounds or modifying agents are typical:

Metal salts, particularly those of alkali metals, earth metals, zinc, magnesium, etc.
Salts of organic acids
Salts of inorganic acids, particularly sulphites, sulphides, carbonates, etc.
Mixtures of metal salts and metal peroxides
Organic acids
    Aromatic
    Aliphatic
Organic bases
    Amines
Hydroxy compounds (phenols, etc.)
Organic compounds containing both an acidic inorganic residue and an organic residue
    Organic halogen compounds
        Aromatic
        Aliphatic
    Organic sulphonic acids and their esters
    Organic sulphonyl chlorides
    Organic esters of inorganic acids
    Inorganic salts of organic bases
    Nitro compounds
    Diphenyl sulphides and sulphones (organic sulphides, etc.)
    Metallo-organic compounds
        Metal alcoholates
        Aryl-metal compounds The above general classes of polar compounds, useful as modifying agents in the practice of my generic invention, are fully illustrated by specific typical compounds in my various prior applications acknowledged ante.

In the present invention, I employ similar polar compounds and procedures for modifying the same type of organic isocolloids, using however those which initially contain a relatively high concentration of dispersed phase; according to my further discovery that such organic isocolloids are more readily and easily modified by such polar compounds and procedures.

As most of the natural organic isocolloids, such as linseed oil and many other fatty oils, in the natural or refined condition, only contain a relatively low concentration of dispersed phase, I usually employ in the present invention, an organic isocolloid the concentration of the dispersed phase of which has been increased by known or other suitable means, such as partially bodied fatty oils, etc.; although other organic isocolloids, either natural or artificial, having a high concentration of dispersed phase may be employed if desired.

Thus in the usual practice of the present invention, I ordinarily employ a new two step method to modify these organic isocolloids, namely, methods which comprise first increasing the concentration of the dispersed phase to a suitable degree by known procedures and thereafter dispersing the modifying agent or polar compound in such materials. By this combination of steps, improved results are obtained. In such methods, I may employ the modifying agents and other details shown in my prior applications in practicing the second step of the new processes. However, in the general practice of the present invention, I may use any natural or artificial organic isocolloid which already has a suitable high concentration of the dispersed phase, this being the main distinction of the present invention.

This distinction is clearly shown by a comparison of some of my prior methods with the present improvement wherein certain advantageous results are obtained. In my prior methods, in cases where the concentration of the dispersed phase of the isocolloid is comparatively small, such as in linseed oil, in addition to the dispersion of the modifying agent or polar compound, an increase in the concentration of the dispersed phase is necessary in making highly modified products such as solidified oils. For instance, in modifying linseed oil with inorganic agents, such as metal salts, by my prior methods, the dispersion of those agents in the oil and the increase in the concentration of the disperse phase of the oil are effected side by side in the same heat treatment. In such methods, as illustrated in Serial No. 143,786, the mixture of linseed oil and metal salt is heated to between 300-350° C. for several hours. In other words, when an inorganic agent is used with such oils, long heating at high temperatures is necessary to disperse them in the oil. Further, such temperatures are sufficient to heat-body the oil, and as disclosed in my Serial No. 359,425, it is advantageous to continue the heating after the polar compound has dissolved to obtain highly modified products. In this way, the concentration of the dispersed phase is simultaneously increased in the heat treatment used to disperse the inorganic modifying agent or polar compound. However, long heating at high temperatures tends to cause discoloration of the oil, that is, darkening of the product. This is probably due to charring of small particles of the oil, caused by local overheating. On the other hand, in many industrial applications, it is very desirable that the modified isocolloids have a light color.

My investigations seeking improvements in this direction lead to my further discovery set forth ante, namely, that isocolloids containing higher concentrations of dispersed phase are more readily modified with the aid of polar compounds. For instance, with organic isocolloids containing the dispersed phase in a satisfactory concentration, a simple dispersion of these modifying agents or polar compounds can produce the desired changes in the physical properties thereof. Also, the modification of such isocolloids can be effected at much lower temperatures, such as 100° to 250° C., than is the case of organic isocolloids containing a low concentration of dispersed phase.

As stated ante, partially bodied or thickened oils are suitable as starting material in my improved processes as they contain the dispersed phase in a relatively high concentration.

Such thickened fatty oils are well known in the art and may be obtained in several ways which are likewise well known methods of thickening or bodying such oils. The following are typical examples of thickened fatty oils of particular types and of the methods of preparing them:

1. Uviol oil, obtained by treating the oil with ultra-violet rays.

2. Oxidized oils or air-blown oils, obtained by blowing air or oxygen over or through the oil to be thickened, either at room or elevated temperatures.

3. Blown oils, non-oxidized, obtained by blowing gases such as carbon dioxide, nitrogen, hydrogen, sulphur dioxide, hydrogen sulphide, etc., through the oil to be thickened and bodied at room temperature or elevated temperatures, elevated temperatures such as 200° C. or above, usually being employed in making this class of thickened oils.

4. Stand oil (heat-bodied or polymerized oil), obtained by heating the oils in an ordinary atmosphere at elevated temperatures for a long time.

Polymerized oils (4) are heat-bodied oils produced by heating unsaturated fatty oils to polymerizing temperatures, 200° C. and above, for several hours until a thickened, viscous, heat-bodied oil product is obtained. They are also known as "stand oil. This method is well known in the art and these heat-bodied oils are a distinct type of commercial oil products. They are somewhat different from oxidized oils or air-blown oils (class 2 ante).

In my present process any of these partially bodied oils, obtained by known methods, and containing a relatively high concentration of dispersed phase may be used.

Thus in my new two step methods of making modified, bodied fatty oil products, I may employ various fatty oils capable of being bodied, such as disclosed in my prior applications acknowledged ante, and increase the concentration of the dispersed phase by known methods and thereafter modify the partially bodied oil with the polar compounds also disclosed in those applications. For instance the fatty oils disclosed in Serial No. 143,786 and Serial No. 359,425 may be used in these two step methods. Among the suitable fatty oils are linseed oil, rapeseed oil, perilla oil, soya bean oil, poppyseed oil, sunflower oil, cottonseed oil, fish oils, such as menhaden oil, etc., (train oils), pineseed oil, corn oil, olive oil, castor oil, etc., or various mixtures of the same. That is, vegetable and animal, including marine animal, oils are generally useful in these methods. Also esters of the fatty acids derived from such oils, other than the natural glycerides thereof may be employed here.

Any of the above oils, etc., may be heat-bodied in the first step of the present invention and then treated with polar compounds to produce valuable modified, heat-bodied products. Likewise, they can be partially bodied by other methods and then further treated in the second step with polar compounds. In the second step of any of these methods, the various polar compounds disclosed in my prior applications may be used.

These polar compounds may be classified in various ways, according to the groups present in the molecule. The following is one broad classification of such compounds, as are useful in the present invention:

Metal salts of inorganic acids
Metal salts of organic acids
Organic salts of organic acids
Organic salts of inorganic acids
Organic bases
Organic acids
Inorganic acids
Organic halogen compounds
Organic nitro compounds
Organic sulphides and sulphones
Metallo-organic compounds As stated in the parent application Serial No. 143,786, the electrolytes or polar compounds useful in the practice of my inventions may be salts, as well as acids and organic metal compounds. In the practice of the present invention or improvement, such compounds containing the following cations or anions or both, are advtantageous:

| As cations; | As anions; |
|---|---|
| Ammonium | Naphthalene sulphonic |
| Sodium | (acid) |
| Potassium | Carbonic (acid) |
| Lithium | Tartaric (acid) |
| Strontium | Oxalic (acid) |
| Calcium | Acetic (acid) |
| Barium | Formic (acid) |
| Magnesium | Hydrochloric (acid) |
| Iron (ferric and | Hydrobromic (acid) |
| ferrous) | Hydroiodic (HI) (acid) |
| Aluminum | Sulphuric (acid) |
| Cobalt | Sulphurous (acid) |
| Lead | Hydrosulphuric (acid) |
| Antimony | Thiosulphuric (acid) |
| Manganese | Nitric (acid) |
| Tin (stannic and | Nitrous (acid) |
| stannous) | Citric (acid) |
| Cadmium | Hydrocyanic (acid) |
| Bismuth | Thiocyanic (acid) |
| Zinc | Maleic (acid) |
| Organic ammonium | Salicyclic (acid) |
| ions, etc. | Sulphanilic (acid) |
| | Napththenic (acid), etc. |

Thus salts of inorganic and of organic acids may be used; both aromatic and aliphatic organic acids. Some of these are salts of monobasic acids and some are salts of polybasic acids, particular dibasic acids. Both neutral and acid salts may be used. Likewise, both the acids themselves and their anhydrides may be employed as the modifying agent in this invention. Hydroxy-acids and unsaturated acids and their salts are also useful here.

In the present invention, the salts of weak acids with alkali metals, with alkaline earth metals, with zinc and with magnesium, such as their sulphides, sulphites and carbonates, are advantageous, particularly in modifying heat-bodied fatty oils. Some of those advantageous methods are claimed in my copending application Serial No. 466,587 now Patent 2,106,708; this application being a division of that application.

This application is primarily directed to the use of organic modifying agents or polar compounds which are fusible and/or soluble at lower temperatures and of other readily soluble polar compounds. Such organic polar compounds or modifying agents are disclosed and fully illustrated in my prior applications, Serial Nos. 143,786, 359,425, 446,170, 446,172, and in the application Serial No. 446,173 filed by myself and one Lajos Susztek. The various classes of such polar compounds and many specific examples thereof are given post.

Also in Serial No. 359,425, I have given other examples of metal salts which are advantageous in the practice of the present invention. Some of these are:

Ammonium iodide
Magnesium sulphate
Magnesium chloride
Zinc carbonate
Zinc bromide
Sodium sulphide
Barium sulphide
Barium thiocyanate
Lead chromate
Potassium dichromate
Cadmium sulphide
Sodium bicarbonate
Lithium sulphite
Tin carbonate
Tin sulphite
Tin sulphide
Antimony sulphide
Zinc sulphide
Barium sulphide
Barium carbonate
Calcium sulphite
Strontium sulphite
Magnesium sulphite
Barium sulphite
Lead sulphite
Cadmium sulphite
Mercuric sulphate
Sodium 2:6:8 naphthylamine disulphonate
Sodium 2:6:8 naphthol disulphonate
Sodium 1:8:3:6 aminonaphthol disulphonate
Sodium 1:5 naphtholsulphonate
Sodium 2:3:6 naphthol disulphonate
Sodium 2:6 naphthol sulphonate In addition to these, other salts of organic acids may be used, such as salts of aliphatic and aromatic carboxylic acids; for instance tartrates, citrates, salicylates, etc. as shown ante. Generally organic salts are more soluble or miscible with organic isocolloids, such as fatty oils, etc.

Thus an advantageous class of polar compounds useful in the present invention are the organic esters of inorganic acids, both aryl and alkyl esters. The following are illustrative of this class:

Triphenyl phosphate
Tricresyl phosphate and other alkyl-phenyl phosphates
Nitrocresyl carbonate
Ethyl chlorosulphonate
Dimethyl sulphate In addition to these, other alkyl and aryl esters of inorganic acids, such as borates, phosphates, sulphides, sulphates, thiocyanates, etc., may be used; for instance, propyl, butyl, amyl esters. Likewise, esters of various aliphatic alcohols and phenols with organic acids may be employed as shown post.

Still another class of modifying agents or polar compounds useful in this invention are the inorganic salts of organic bases, of which the following compounds are illustrative:

m-Nitroaniline hydrochloride
Diphenylamine hydrochloride
Diphenylamine hydrobromide
Trichloroaniline hydrochloride
Diphenylamine sulphate
Diaminodiphenyl sulphate
Aniline sulphate
Amino-azo-benzene sulphate Several of the above compounds in addition to being salts, contain other groups which impart polarity to the compound, such as nitro, amino and halogen groups. Compounds containing such groups are useful per se in this invention as polar compounds or modifying agents as shown post.

As examples illustrative of organic salts of organic acids, there may be mentioned diphenylamine trichloroacetate and methyl p-toluene sulphonate. Other wholly organic salts may be used. For instance, the alkyl and aryl esters of the various acids mentioned ante, such as tartrates, oxalates, acetates, formates, thiocyanates, salicylates, etc., may be used in the present invention. These are illustrative of the esters of mono- and di-basic acids which may be employed. Likewise, alkyl and phenyl esters of other aliphatic and aromatic carboxylic acids, both of mono-basic and di-basic acids, such as phthalates, benzoates, acetates, abietates, oleates, stearates, laurates, palmitates, ricinoleates, etc. may be used. Both the mono- and di-esters of di-basic acids are useful here. Likewise mixed alkyl and aryl esters can be employed in some cases. Typical examples are as follows:

Di-butyl phthalate
Mono-butyl phthalate
Di-ethyl phthalate
Ethyl-butyl phthalate
Di-phenyl phthalate
Ethyl-phenyl tartrate
Methyl abietate
Ethyl abietate
Di-ethyl succinate
Phenyl thiocyanate
Ethyl malonate
Diethylammonium diethyldithiocarbamate
Ethyl salicylate
Ethyl ether of ethyl salicylate
Butyl ether of ethyl ricinoleate That is ether esters and acid esters may be also employed here. Further thioesters, such as diaminodiphenyl sulphide, may also be used; they being so to speak organic esters of organic mercaptans (R—S—H) which are more or less sulphur acids. Other useful organic sulphides are diphenyl sulphide, ethyl phenyl sulphide and the alkyl thioethers of nitro-benzenes, such as ethyl thioether of 2-nitrobenzene or of 2:4 dinitrobenzene. That is the phenyl group of such sulphides may be further substituted with groups such as amino, nitro, etc.; these groups increasing the polarity of the molecule.

In fact, nitro compounds per se are advantageous in the practice of the present invention, as is illustrative in the specific examples given post.

As examples of nitro organic compounds, here useful as the polar compound or modifying agent, the following are typical:

o-Nitrophenol
p-Nitrophenol
Nitrobenzene
Dinitrobenzene
Dinitroaniline
p-Nitro acetanilide
Nitrocresol carbonate
m-Nitroaniline hydrochloride These illustrate the various general types of compounds that may be used, in addition to the nitro compounds shown in other classifications of the polar compounds here useful.

The nitro compounds are but one type of the organic polar compounds which I may use as modifying agents in the present methods. I have found, as stated in my prior applications, that they and other polar compounds which contain an organic residue and an inorganic acidic residue, are generally useful as modifying agents for these purposes. By an inorganic acidic residue, I mean such an inorganic residue as can be converted, by the addition of one or more hydrogen atoms or water into an inorganic acid. Such organic polar compounds may be represented by the following generic formula:

$$A-X$$

wherein A represents the organic residue and X represents the acidic inorganic residue. The acidic inorganic groups may be nitro, sulphur containing radicles, halogen, etc. and one or more such groups may be present in the molecule and attached to the organic residue. Carbonic acid is regarded herein as an inorganic acid.

One advantageous class of these organic polar compounds is the organic halogen compounds, both aromatic and aliphatic, containing chlorine, iodine, bromine, etc., and illustrative compounds of this class are given post.

The following compounds are typical halogenated organic polar compounds and may be used in the practice of this invention:

o-Dichlorobenzene
p-Dichlorobenzene
Trichlorobenzene
Nitro-chlorobenzenes, ortho, meta and para
Nitro-dichlorobenzene
Chloro-dinitrobenzene
Nitro-chloro-phenol
Chlorotoluene
Chloroxylene
Chlorophenol
Naphthalene tetrachloride
Naphthalene trichloride
Naphthalene hexachloride
Naphthalene monochloride
Chlorinated diphenyl
Mono-chlorobenzene
Pinene hydrochloride
4-chloro-o-anisidine
p-Nitro-chloro-benzene
Triphenyl-chloro-methane
Diphenyl-dichloro methane
Benzyl chloride
Benzoyl chloride
Acetyl chloride
Acetyl bromide
Acetyl iodide
Phthaloyl chloride
Propionyl chloride
Butanoyl chloride
Chloral hydrate
Trichloroacetic acid
Monochloracetic acid
m-Nitroaniline hydrochloride
Diphenylamine hydrochloride
Diphenylamine trichloroacetate
Trichloroaniline hydrochloride
Diphenylamine hydrobromide
Iodoform
2:5 dichlorbenzene sulphonic acid
Benzene sulphonyl chloride
p-Toluene sulphonyl chloride
Naphthalene-1-sulphonyl chloride
Ethylchlorsulphonate In lieu of the above compounds, other halogenated aryl compounds, aliphatic chlorides, acyl chlorides, chloroacids, hydrochloride salts, etc., may be used here.

From the above list, it is clear that many of the organic halogen compounds contain other substituents in addition to the halogen, such as hydroxy, amino, nitro, alkyl, aryl, and other groups. Therefore they may be classified in other groupings of these modifying agents. Likewise, it is clear that the organic halogen compounds shown contain varying percentages of halogen; compounds containing 1 to 6 atoms of halogen in the molecule being set forth. Some of the halogen compounds are di- and tri-phenyl compounds, whereas others contain only a single benzene nucleus.

Another advantageous class of modifying agents is the aromatic sulphonic acids, together with their salts, esters and halides. Of these the sulphonic acids and the sulphonyl chlorides are particularly useful here.

These polar compounds may be represented by the following generic formula:

$$R-SO_n-X$$

wherein R represents an aryl nucleus, X represents hydrogen, chlorine or an alkyl group or a metal and $n$ is 0 to 4. Typical examples of such compounds are the following compounds:

Benzene sulphonic acid
p-Toluene sulphonic acid
2:5 dichlorobenzene sulphonic acid
m-Xylidine sulphonic acid
p-Toluidine-m-sulphonic acid
Naphthalene 2:6 sulphonic acid
Beta-naphthol 1:5 sulphonic acid
Beta-naphthol 3:6:8 sulphonic acid
Beta-naphthylamine 3:6:8 trisulphonic acid
2:1 naphthylamine sulphonic acid
2:6 naphthylamine sulphonic acid
2-phenylamine-8-naphthol-6-sulphonic acid
Methyl-p-toluene sulphonate
Ethyl chlorosulphonate
Benzene sulphonyl chloride
p-Toluene sulphonyl chloride
Naphthalene-1-sulphonyl chloride
Dimethyl sulphate
Diaminodiphenyl sulphide
Diaminodiphenyl sulphone
Nitrophenyl ethyl sulphide
Diaminodihydroxy anthraquinone disulphonic acid
Diaminotetrahydroxyanthraquinone disulphonic acid Metal salts of such sulphonic acids have been shown ante, such as the sodium salts, etc., and all of these compounds are useful here in the present methods.

Many of the polar compounds illustrated ante in the various classifications also contain amine or amino groups. In the present invention amine compounds as a class are useful. My prior application Serial No. 446,170 is primarily directed to modifying organic isocolloids with amine compounds as the polar compound. As there disclosed, amines having a relatively high molecular weight are advantageous; particularly aromatic amines such as mono- and di-amines of naphthalenes, etc., and diamines of phenylene, diphenyl and such compounds. This application is in part a division and in part a continuation of Serial No. 446,170, Patent No. 2,234,949. In the present invention, as in the methods of that prior application, compounds containing primary, secondary or tertiary amine groups and containing two or more amine groups may be used as the modifying agent. The following amine compounds are typical examples of this class of modifying agent:

Mono-aromatic amines
    Alpha naphthylamine
    Beta naphthylamine, and
    Naphthylamine also containing sulphonic, hydroxy, and other substituent groups in the molecule, as shown ante and post.
Phenylene diamines $H_2N$—R—$NH_2$
    Para-phenylene diamine
    Ortho phenylene diamine
    Meta phenylene diamine
    Para-tolylene diamine
Diphenyl diamines $H_2N$—R—R—$NH_2$
    Benzidine
    Dianisidine
Diphenyl diamines of complex structure having the two phenyl groups connected with a "bridge" linkage.

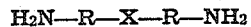

$$H_2N-R-X-R-NH_2$$

pp-Diamino-diphenyl methane, ($XCH_2$)
pp-Diamino-diphenyl ether, (XO)
pp-Diamino-diphenyl sulphide, (XS)
pp-Diamino-diphenyl amine, (XNH)
pp-Diamino-diphenyl urea, (XHN—CO—NH)
pp-Diamino-diphenyl thiourea,
                            (XHN—CS—NH)
pp-Diamino-diphenyl benzophenone, (XCO)
pp-Diamino-diphenyl guanidine,
                            (XHN—CN—NH)

It is to be noted that in some of these compounds sulphur or oxygen are present in the molecule in addition to the amine groups. Some contain secondary amine groups in addition to the primary amine group. In addition to these, amines of even more complex structure may be used.

The following are illustrative of such compounds:

1:4 diaminoanthraquinone
Diamino dihydroxy anthraquinone disulphonic acid
Diamino tetrahydroxy anthraquinone disulphonic acid
p-Diamino-dimethyl carbazole
Diaminodiphenazine
Diaminofuchsonimine
Mercaptobenzthiazole
Piperidine pentamethylenedithiocarbamate
Heptaldehydeaniline
Diphenylguanidine
Tolylguanidine
Amine-aldehyde condensation products In many of these diamines the two amine groups are joined by an aromatic nucleus comprising one or more phenyl groups, the general formula being $H_2N$—Q—$NH_2$ wherein Q is an aromatic group.

One of the advantages of the amines as modifying agents is that they are relatively easier to dissolve or disperse in fatty oil and other isocolloids to modify them.

The amines may be used by themselves or in conjunction with other modifying agents, etc., in modifying organic isocolloid materials according to the present invention. For instance, the amines may be used in conjunction with compounds comprising within the molecule an acidic inorganic residue and an organic residue, such as given ante. Sometimes they may also be used with certain auxiliary materials, as shown in Serial No. 446,170 and other copending applications of mine. Again, it is sometimes advantageous to use as the modifying agent an organic polar compound containing both an amine group and an acidic residue, such as the amino-aromatic sulphonic acids and other compounds of that type shown ante.

Serial No. 446,170 is specifically directed to methods wherein a fatty oil is mixed with a small amount, usually 1 to 10 per cent of an amine of high molecular weight and the mixture heated to 200° C. or above, until a solidified oil product is obtained on cooling. As shown in that application, using a stand oil as the starting material gives an improved process and product. The present application is directed to the latter method, and as to this, it is a continuation-in-part of Serial No. 446,170, Patent 2,234,949.

In addition to the amines shown in Serial No. 446,170 and those mentioned ante, I may also use other organic bases as the modifying agent in the present processes. Many such organic bases are disclosed in my prior applications; for instance, naphthols, phenols, etc., of some examples have been already given here.

The following compounds are typical of the organic bases useful in modifying organic isocolloids by the present methods:

o-Nitrophenol          Dihydroxybenzene
p-Nitrophenol          Glycerol
Dinitroaniline          Quinoline
Alpha-naphthol        Diaminodiphenyl-
Phenol                     guanidine
Cresol                    Diphenylguanidine
Xylol                     Aminonaphthol
Pyrogallol            Aminophenol
                        Diphenylurea Clearly a wide range of organic bases may be used, according to the type of modified isocolloid product to be obtained from a given starting material. Also the use of aryl-hydroxy compounds, as the modifying agent, is further illustrated by the compounds given ante under other classification.

However, in most embodiments of the present invention, the organic bases are used in conjunction with other modifying agents, they being employed to give an additional modification in the properties of the products obtained, as is pointed out in my prior applications Serial Nos. 143,786, 359,425 and 359,427. The organic bases may be used here in conjunction with metal salts, acids, acid chlorides (acyl chlorides), etc., employing the proportions and procedures of my prior applications.

In fact, in the present invention acids themselves may be used alone as the modifying agent and are an important class of polar compounds for use in these improved methods. Certain of the advantageous acids, particularly the organic acids, have been described ante. In connection with the salts and esters, I mentioned many acids and these are suitable for use in the form of the free acid as well as in the form of metal salts and esters. As mentioned ante, acid salts may be used and these are, so to speak, partly neutralized acids; that is, they are of acid character.

Thus a further important class of polar compounds useful in some of the present methods is the acids, particularly the organic acids. Both aromatic and aliphatic acids may be used. Some of these have been mentioned ante. To further illustrate this class and the subclasses thereof, the following typical examples of such compounds are given:

| | |
|---|---|
| Formic | Lactic |
| Acetic | Succinic |
| Monochloracetic | Maleic |
| Trichloracetic | Malic |
| Propionic | Benzoic |
| Butyric | Phthalic |
| Isovaleric | Salicyclic |
| Capric | Sulphosalicylic |
| Lauric | Hydrocyanic |
| Palmitic | Thiocyanic |
| Oxalic | Sulphanilic |
| Tartaric | 2:3 hydroxynaphthoic |
| Citric | Alpha-naphthyl-sulphamic |
| Ricinoleic | |
| Crotonic | Benzene sulphonic and the other aryl sulphonic acids shown ante |
| Malonic | |
| Hydrooxyacetic acid | |

Other similar acids may be used. Likewise, the halogen derivatives of these acids may be employed such as the chlor-acids of which the chloracetic acids given ante are typical. Also the anhydrides and acid chlorides (acyl chlorides) of the above and similar acids may be used here as the modifying agent; the acetyl and benzoic chlorides also shown ante being typical examples. As already shown, salts of these acids, both metal and organic salts, may be used as the polar compound here.

Sometimes it is advantageous to form the polar compound in situ in the organic isocolloid being modified in the present methods as was done in some of my prior processes, using two agents which can react to form the desired polar compound in situ. This is possible when acyl chlorides are used in conjunction with certain other compounds or secondary agents, such as organic bases and metallo-organic compounds; examples of the latter being shown in my Serial No. 273,159. Those metallo-organic compounds, such as metal alcoholates of aliphatic alcohols and of phenols and metal aryl compounds, are themselves polar compounds and are useful here as modifying agents, as shown post. Likewise, inorganic polar compounds may be formed in situ in the material being modified in the present processes using the methods shown in my prior application, such as Serial No. 359,425 and the other applications filed simultaneously therewith.

Generally, I find it is sometimes advantageous to use, in conjunction with the primary modifying agent or polar compound, another compound which I term "auxiliary agents" or "sensitisers". That is, I have further found that in the present methods that the dissolution of the electrolytes or polar compounds in the starting materials (isocolloids) and the modification processes are facilitated by the addition of the so-called auxiliary or sensitizing agents. These fall into two groups, namely, the purely inorganic agents, such as silica gel, fuller's earth, etc., and the purely organic agents, of which typical examples or illustrations are given post. For instance, silica gel or fuller's earth may be admixed with metal salts, particularly acid salts, or acids, etc., or impregnated with solutions of these polar compounds and dried, and such mixtures used to effect the modification of the isocolloid in lieu of the polar compound alone. In this way, the action is expedited, particularly with fatty oils.

As to the purely organic agents useful as sensitisers or auxiliary agents, I may mention the following:

Formaldehyde and other aldehydes
Hexamethylenetetramine
Thiocarbanilide
Phthalimide
Benzidine and other amines
Phenol and other aryl hydroxy compounds
Alpha naphthol
2:3 hydroxynaphthoic acid
Quinoline
Pyrogallol
Glycerol
Benzene and other volatile solvents.

The specific examples of auxiliary agents mentioned above are to be taken as typical of the substances which have been successfully used for this purpose and not as comprising all the effective substances which may be used. In fact, some of those substances are themselves polar compounds. That is, I may use one of the polar compounds to serve as an auxiliary agent for another one of them, used as the primary modifying agent. Some further examples of polar compounds which are also useful in the present methods as auxiliary agents or sensitisers, are as follows:

Amino-azobenzene sulphate
Aniline sulphate
Dimethyl sulphate
Nitrocresyl carbonate
Triphenyl phosphate
Tricresyl phosphate
Pale cresylic acid
Trichloracetic acid
Benzene sulphonic acid
m-Xylydinesulphonic acid
Beta-naphthylamine-6:8-disulphonic acid
Beta-naphthyl amine-6-sulphonic acid
2:6 naphthalene disulphonic acid
Aminosalicylic acid
Oxalic acid
Formic acid
Naphthalene sulphochloride
Acetyl chloride
Pinene hydrochloride
Chloral hydrate
Naphthalene tetrachloride
Iodoform
o-Dichlorbenzene
p-Dichlorbenzene
Monochlorbenzene
Trichlorbenzene
Diphenylamine hydrobromide
p-Nitroacetanilide For instance, the dissolution of 5 per cent of sodium bisulphite or other salt in linseed stand oil is facilitated by the addition of 2 per cent of any of the above auxiliary agents or sensitizers, to the mixture prior to the heating. Also in this way a lighter colored product is obtained. As the amount of metal salt is varied, the percentage of auxiliary agent may also be varied. That is, using 10 per cent of polar compound instead of 5 per cent, the amount of auxiliary agent may likewise be increased say to 4 per cent. Further, the ratio of polar compound to auxiliary agent can also be varied; the amount of auxiliary agent may be larger or smaller than that of the polar compound, according to the results sought.

Thus, there are several ways of carrying out the present invention, according to the polar compound and procedure selected from those shown in my prior applications, or according to the way in which the concentration of the dispersed phase of the organic isocolloid is increased prior to such treatments.

But generally the methods of this invention for modifying the physical properties (such as melting point, viscosity, solubility, state of aggregate, film strength, etc.) of organic isocolloids, comprise first increasing the concentration of the dispersed phase to a suitable degree, such as by partially bodying a fatty oil, and then dispersing the modifying agent in the material so obtained (bodied oil, etc.) with the aid of heat, etc., to obtain improved products. In the present methods, I find it advantageous to employ organic polar compounds in the second step.

In using organic polar compounds as the modifying agent in these processes, I find it is advantageous to use those having the following formula:

wherein R represents an aryl residue, and A, B, C and D represent hydrogen or a group of the class consisting of nitro, halogen, hydroxy, amino, substituted amino, ether, thioether, carboxylic, ester, sulphonic, chlorosulphonic, sulphonate groups, at least one such group being present. Advantageously, two or more of such groups may be present, each of which is different from the others, such as amino naphthols, amino and amino-hydroxy-sulphonic acids, etc. Also, in the practice of the present invention, I may use metal peroxides as the modifying agent; for instance, I may employ the procedures and particular metal peroxides disclosed in my applications Serial Nos. 359,426 or 359,425. Again, as shown in Serial No. 359,425, the metal peroxides may be used in conjunction with metal salts, and this is also useful in the present methods.

In the present methods, peroxides of alkali metals, such as sodium, potassium, etc., of alkaline earth metals, such as barium, calcium, magnesium, etc., and of zinc, bismuth, etc., are advantageous. They may be advantageously employed to modify either air-blown oils or heat-bodied oil, as well as being generally useful for modifying organic isocolloids containing a high concentration of dispersed phase. When a heat-bodied oil is so modified, the oil products obtained are oxidized heat-bodied oils, and have in part the properties of an oxidized oil and of a heat-bodied oil. These oil products are heavily bodied, viscous oils, or thermoplastic solids, and are useful in making various liquid and plastic compositions.

In the present invention, in using metal peroxides in conjunction with metal salts, it is advantageous to use a metal peroxide, for instance barium peroxide, with the alkali metal, or alkaline earth metal or zinc carbonates, sulphites, sulphides, etc.; that is, with the metal salts of weak acids. Metal salts of organic acids may be used in such methods.

As a further improvement in the present invention, volatile solvents may be employed to facilitate the dispersion of the polar compound in the organic isocolloid being treated. That is, I may employ solutions of the modifying agents in organic solvents. Suitable solvents are benzol, toluol, methyl-ethyl ketone, ether, acetone, a mixture of ether and acetone, amyl acetate, butyl alcohol, amyl alcohol, etc. Other aromatic and aliphatic hydrocarbons, ethers, ketones, esters and alcohols may be used. Either low-boiling or high boiling solvents may be employed according to the particular organic isocolloid, polar compound and procedure used. In this way, the modifying agents can be dispersed in the isocolloid at lower temperatures, using either inorganic or organic polar compounds, the latter being the most advantageous in such methods.

In most cases, heating the solvent-containing mixtures to between 120° and 130° C. gives good results. Only in a few cases is it necessary to heat for a short time at 200° C. The heating of such mixtures may be effected under various conditions of pressure, as in the direct use of the polar compound without solvent. By heating these solvent-containing mixtures under subatmospheric (reduced) pressure to such temperatures, all or most of the solvent is distilled off and modified products substantially free of solvent may be directly obtained. If further modification is desired, the products so obtained and containing the polar compound dispersed therein may be further heated to obtain very highly modified materials. This further heating may be to somewhat higher temperatures and any residual solvent may be simultaneously removed.

Again, the solvent-containing mixtures may be heated in a closed vessel under increased pressure, until the desired modification is obtained in the presence of the solvent, and then the modified product recovered free of solvent by releasing the pressure. This release of pressure flashes off the solvent and cools the modified product. Any solvent remaining in the modified product so obtained can be removed by subsequent evaporation or distillation, if present and as desired. In such methods, the pressure during the first heating may be equal or greater than the vapor pressure of the solvent at said temperature of heating and under the conditions for modification. In this way, the solvent is retained in the mixture. If desired, all of the solvent may be retained in the liquid condition during the modifying treatment.

Various illustrations of the above methods, using solvent, are given post. In such methods, a minor amount of solvent is ordinarily used, a volume of solvent less than that of the oil or organic isocolloid. But in some cases, greater amounts of solvent can be used.

The amount of polar compound or modifying agent used in the present processes is usually less than 30 per cent by weight of the oil or organic isocolloid employed. In most cases, from 2 to 10 per cent gives good results and is used. In certain cases less than 2 per cent may be used, sometimes as low as 0.5 per cent.

In carrying out the processes of the present invention, all the methods and means disclosed in my said prior applications can be used and the products obtained may be further modified in the various ways stated in such prior applications for the subsequent modification of such organic isocolloid products. That is, the products obtained by the present methods may be further treated and modified by vulcanization, emulsification, etc., according to the methods and means given in the prior application therein acknowledged ante.

By the expression "dissolving" or "colloidally dispersing" in the aforegoing specification, not the disappearance of an, e. g., fusible modifying agent is meant, but that the particles of the modifying agent are adsorbed by the particles of the material being treated, so that the "dispersion" always takes a certain time, generally at least one hour and only in exceptional cases less.

The products of the present processes are particularly useful as varnish bases, as plasticizers and as rubber compounding ingredients, either in the vulcanized or unvulcanized state.

As there are many ways of practicing the present invention, and as a wide range of useful products can be produced by selecting the organic isocolloid, particular polar compound and details of treatment, I present the following typical examples as illustrations of the practice of this invention, without any intention of being limited to the exact details thereof. In other words, these examples are merely illustrative and not limitative of the present processes and products.

*Example 1*

This example illustrates the preparation of a heat-bodied fatty oil suitable for modification by the present methods.

Into a suitable open kettle, there is charged 1000 lbs. of refined linseed oil and the oil is heated to 290–310° C.; about 2 hours being required to bring the oil to that temperature. The oil is maintained at this temperature for about 5 hours to thicken and polymerize it. The heating is then discontinued and the oil permitted to cool. When at room temperature, the partially bodied oil so obtained is of medium viscosity and has a satisfactory color. It is soluble in the usual varnish and lacquer solvents.

The so bodied oil is withdrawn from the kettle and stored in suitable containers.

However, if desired, the second step or modification of the oil may be effected in the same kettle in a continuous process, and sometimes this is done in the practice of this invention. In that case, the oil is not withdrawn from the kettle, but is cooled to the desired temperature for adding the modifying agent to be used, and the further treatment then effected as described ante.

In the above example, the surface of the oil may be blanketed with an inert gas such as nitrogen or carbon dioxide, if desired. Also the bodying of the oil may be done in a closed kettle, advantageously under reduced pressure.

Also, a slow current of non-oxidizing gas, such as nitrogen, $CO_2$, $SO_2$, $H_2S$, etc., may be passed into and through the oil while being heated to thicken it. Further, with closed kettles, the heating may be under pressure.

In the above procedures, other fatty oils may be used in lieu of linseed oil and bodied in like manner, for instance, perilla oil, soyabean oil, castor oil, sunflower oil and the other similar fatty oils described ante. Other polymerizing temperatures may be used. Sometimes a longer heating at 250–280° C. is used to give a lighter product.

*Example 2*

This example illustrates the preparation of oxidized or air-blown oils useful in the present invention.

1000 lbs. of linseed oil are heated to 80° to 95° C. in a closed kettle having an open outlet to prevent the formation of pressure during blowing and the heated oil is blown with air in a regular stream through the oil for about 15 hours. Upon cooling to room temperature a viscous, oxidized oil is obtained.

The blowing may be combined with a vacuum treatment or a pressure treatment by regulating the gas inlet valve and the valve properly to change the pressure of the gas in the kettle from atmospheric pressure.

By substituting sulphur dioxide for the air in the above procedure, there is obtained still another oil product; a viscous, blown, non-oxidized oil, which is also useful in the present invention. With sulphur dioxide higher temperatures may be used than with air or oxygen in so blowing the oil to thicken it.

*Example 3*

This example illustrates the modification of bodied oils.

To 1000 lbs. of the linseed oil obtained in Example 1, there is added 50 lbs. of benzenesulphonic acid and the mixture is heated to 140–150° C. and maintained at that temperature for 2 hours. Upon cooling to room temperature there is obtained a heavily bodied viscous oil product.

The modified bodied oil product so obtained is useful in making paints and varnishes and improves the alkali-resistance of the coatings obtained from such paints and varnishes.

In the above example, in lieu of benzenesulphonic acid, other organic polar compounds may be used, such as 2:5-dichlorobenzene sulphonic acid, benzene sulphonyl chloride, p-nitrophenol, o-nitrophenol, benzidine base, naphthalene tetrachloride, etc. Also the various other polar compounds disclosed herein may likewise be employed in the above method.

The next example illustrates the modification of another type of partially bodied fatty oil, namely, the oxidized or air-blown oils.

*Example 4*

To 1000 lbs. of the air-blown oil obtained in Example 2, there is added 50 lbs. of p-toluene sulphonic acid and the mixture is heated to 140–150° C. and maintained at that temperature for 3 hours. Upon cooling to room temperature there is obtained a heavily bodied, viscous oil product.

The modified bodied oil product so obtained is useful in making paints and varnishes and improves the resistance of their films to chemicals, such as acids, salts, etc.

If in the above example blown castor oil is used, instead of blown linseed oil, and sulfo-salicylic acid is used in lieu of the p-toluene sulphonic acid as the modifying agent, another and somewhat different oil product is obtained. This modified bodied oil is useful in preparing nitro-cellulose lacquers. The films obtained from such lacquers have increased chemical resistance. The modified bodied castor oil product is a plasticizer for nitro-cellulose and the like.

The following examples illustrate my processes wherein a solvent is employed as an auxiliary agent to facilitate the dispersion or dissolution of the polar compound in the organic isocolloid.

*Example 5*

5 parts of p-nitrophenol are dissolved in 22 parts of warm benzene and the solution is mixed with 100 parts of linseed oil stand oil, containing 12 parts of benzene. The mass is then heated in vacuo at 120° C. until the solvent has been distilled off. The temperature is then raised to 200° C. and the mass is maintained in vacuo for 2 hours at this temperature. A very viscous paste is obtained.

Example 6

5 parts of o-nitrophenol are dissolved in 7 parts of warm benzene and the solution is mixed with 100 parts of linseed oil stand oil containing 27 parts of benzene. The mass is heated as in example 5, except that after the solvent has been distilled off the mass is heated in vacuo for half an hour at 200° C. The product is a solid gel at room temperature.

Example 7

5 parts of benzoic acid are dissolved in 30 parts of warm benzene and the solution is mixed with 100 parts of linseed oil stand oil and the mass is heated to 80° C. If the process is continued as in Example 5 and the heating at 200° C. is continued for 2 hours and 20 minutes, a thick oil is obtained.

Example 8

100 parts of linseed oil stand oil are mixed with 5 parts of benzene sulphonyl chloride dissolved in 5 parts benzene and the mass is heated in vacuo at a temperature of 120–130° C. for 3 hours. The product is a gelled, very viscous oil. The solvent distills off during the heating.

Example 9

If instead of benzene sulphonyl chloride used in Example 8, a solution of 5 parts of chlorsulphonic acid in 5 parts benzene is heated with the oil under similar conditions for 40 minutes at 110–125° C., a sticky elastic gel will be obtained.

Example 10

If in Example 8 a solution of 5 parts of barium thiocyanate in 10 parts of methyl ethyl ketone is employed and is heated with the oil at 150° C. for 3 hours, a soft elastic solid is produced.

Example 11

5 parts of zinc bromide dissolved in 30 parts of benzene yields a viscous oil when heated with the oil at 120° C. for 9 hours.

Example 12

5 parts of naphthalene tetrachloride dissolved in 30 parts of ether yields a sticky elastic mass when heated with the oil at 120° C. for 5¾ hours.

Example 13

100 parts of linseed oil stand oil are mixed with 5 parts of 2:5 dichlorbenzene sulphonic acid dissolved in 40 parts of benzene and the mass is heated in vacuo at 100–120° C. for 5 hours. The product is an elastic gel.

Example 14

If the stand oil is treated with 2:5 dichlorbenzene sulphonic acid as such (without the added solvent) under similar conditions to those described in Example 13, a like product is obtained.

Example 15

1000 parts of castor oil (having an acid number of 9) are heated with 2 parts of sulphosalicylic acid in an autoclave, to 270° C., while slowly bubbling $CO_2$ through the mixture and maintaining a vacuum of 50 mm. Hg on the autoclave. The mixture is so heated at 270° C. under vacuum for one hour. Then the temperature is reduced to 250° C. and the mixture maintained at that temperature for two hours. Finally the temperature is dropped to 200° C. and the mixture held at this temperature until the modification is completed, about two hours at 200° C. being usually required. During all of these heatings, the introduction of the $CO_2$ gas is so controlled as not to destroy the desired vacuum.

The modified castor oil so obtained has good drying properties and has an increased concentration of dispersed phase. The organic polar compound, maleic anhydride, is added to the modified castor oil, using from 5 to 10 per cent of the anhydride based on the weight of modified castor oil. The mixture is then heated between 100° C. and 200° C. under a vacuum until distillation ceases. An equal volume of soya bean oil is added and the temperature is raised to about 260° C. and held until a viscosity of about 50 poises is obtained.

The oil so prepared is quite acid in character, and in this condition it is admirably suited to the production of emulsions, e. g. by neutralizing with an alkaline agent and dispersing with water. Such emulsions are applicable to the production of paints, when pigments are incorporated.

In the above example any modified castor oil with air drying characteristics may be used to replace the sulpho-salicylic acid treated castor oil. Further, the soyabean oil may be replaced with any drying or semi-drying oil, and the percentage may be increased from the proportion of 1 castor oil to 1 non-castor oil up to the proportion of 1 to 10. These proportions are illustrative and not limitative. Driers may be added when desired.

Example 16

The same as Example 15 except that the maleic anhydride is replaced by monobutyl maleate.

Example 17

The same as Example 15 except that the maleic anhydride is replaced by disodium maleate.

Example 18

The same as Example 15 except that maleic acid is used instead of maleic anhydride.

In Examples 15 to 18 the polar compound has been specified as maleic acid and some of its derivatives. Similar results may, however, be obtained with their isomers and homologs. Also, it is sometimes advantageous to mix the drying castor oil with the other oil ingredient before proceeding with the maleic treatment.

In Examples 5 to 14 ante, instead of linseed oil stand oil, raw or natural tung oil (wood oil) may be used and converted into a modified bodied product. Tung oil, in the natural or raw condition, already contains a very high concentration of dispersed phase and is an example of a natural isocolloid of that type. Thus it can be modified by the present methods without first bodying it to increase the dispersed phase thereof. However, this may be done in some embodiments of the present invention.

Thus according to the present invention, in the case of wood oil or tung oil, the natural oil as well as a bodied tung oil (wood oil stand oil) may be used. When tung oil is heated in the presence of solvents, as in the above examples, sudden gelatinization or coagulation to an insoluble body (a characteristic property of tung oil) does not occur. Thus by the present methods, I can modify and body tung oil without danger of such coagulation.

In methods such as used in the above examples, wherein a solution of modifying agent is added to the oil and the mixture heated, the tung oil is simultaneously modified and bodied, the dispersed phase being both increased and modified by the adsorbed polar compound. This occurs when the heating is under either reduced or increased pressure, although heating under increased pressure to 200° C. or above gives greater bodying. Like bodying also occurs even if the modifying agent is omitted, but in such case no modification other than simple heat-bodying is obtained.

Thus in some of the present methods, I may first heat-body the tung oil by heating to polymerizing temperature in the presence of a solvent under increased pressure, without gelling it, and then subsequently modify the heat-bodied tung oil with the modifying agents as disclosed ante with linseed oil, rather than simultaneously modify and heat-body it as mentioned ante. As shown in my prior applications, tung oil may be heat-bodied by heating under increased pressure, either with or without the addition of organic solvents. Here too tung oil may be heated under increased pressure to obtain a heat-bodied oil which is then treated with the polar compound. Also tung oil may be heat-bodied by known methods, such as heat-bodying a mixture of 3 parts of tung oil and 1 part of linseed oil; the presence of the linseed oil preventing the sudden gelatinization or coagulation of the tung oil which would otherwise occur when it is heated to 540° F. at atmospheric pressure. Such heat bodied mixed linseed-tung oil product may be used in the present methods and modified with the polar compounds, instead of linseed oil stand oil. Another method to produce heat bodied tung oil is to heat it at comparatively low temperatures, such as, e. g., 200° C., and to finish the heating before the danger of gelatinization occurs. Also, blown tung oil may be used in this process.

Besides bodied fatty oils, the following products may form isocolloid systems with increased concentration of disperse phase, and may be treated according to the various embodiments of this invention: esters of polyhydric alcohols containing or consisting of fatty acids, other than triglycerides such as fatty oils, (for instance diglycerides, glycol esters, oil modified alkyd resins, rosin or oil modified phenolic resins), synthetic resins containing or consisting of fatty acids, rosin acids or naphthenic acids, metastyrene containing styrene, asphalt, goudron, pitches, animal and vegetable waxes, etc.

To obtain factises with improved properties, to be used as rubber compounding ingredients, I heat the modified fatty oil products obtained according to the above described processes with 3 to 25% of sulphur to vulcanizing temperatures. Such temperatures range between 120° and 160° C. The duration of the procedure is dependent on the starting material and product to be obtained. Vulcanization accelerators, such as mercaptobenzthiazole, amongst others, may be used, and also activators, such as zinc oxide.

In my two-step method of making modified, bodied fatty oils, I find it advantageous to produce partially bodied, heat-bodied oils having a viscosity between 0.5 and 1300 centipoises, in the first step thereof; such partially bodied oils being readily adaptable to the second step wherein they are further modified. Other partially bodied oils such as oxidized oils, blown oils and Voltol oils (bodied by subjecting the oil to electric potential), etc., having such viscosities are also advantageous.

From the point of view of this specification China-wood oil is considered to be similar to heat-bodied linseed oil, as it has a sufficiently high percentage of dispersed phase. A modified castor oil, which has been modified to increase its drying velocity, has a distinct similarity to China-wood oil. This modified oil may be used in accordance with this invention as the solvent for the polar compound. The dispersed phase concentration of a fatty oil may be measured by flocculating same with formic acid and separating the flocculated portion by centrifuging or fractioned dissolution.

What is claimed is:

1. In the manufacture of modified, heat-bodied oil products from fatty oils, the process which comprises heating the fatty oil to polymerizing temperatures until a heat-bodied oil product is obtained and then adding to the heat-bodied oil so obtained a minor amount of an organic polar compound capable of facilitating the bodying of said fatty oil and of modifying the physical and other properties of the heat-bodied fatty oil, and further heating the mixture at polymerizing temperature until the organic polar compound is dissolved and a modified heat-bodied oil product is obtained, the said organic polar compound being a metal-free organic polar compound and the amount of said organic polar compound being sufficient to substantially modify the physical properties of the heat-bodied oil so obtained, said polar compound being added to the mixture in the form of a solution.

2. The process according to claim 1, in which the solvent of the solution is an organic solvent.

3. The process according to claim 1, in which the solvent of the solution is a modified castor oil having drying properties.

4. The process according to claim 1, in which the polar compound is an aromatic sulphonic acid and the solvent is volatile.

5. The process according to claim 1, wherein the polar compound is a polycarboxylic organic acid.

6. The process according to claim 1, wherein the polar compound is a dicarboxylic organic acid.

7. The process of claim 1, in which the polar compound is an unsaturated dicarboxylic organic acid and the solvent is a modified castor oil having drying properties.

8. The process of claim 1, in which the solvent of the solution is a modified castor oil having drying properties and the polar compound is an anhydride of an unsaturated dibasic acid.

9. The process of claim 1, in which the polar compound is a dibasic acid of the class of maleic and its anhydride.

10. In the manufacture of modified, heat-bodied oil products from fatty oils, the process which comprises heating castor oil to polymerizing temperatures in the presence of a modifying polar compound until a drying castor oil product is obtained and then adding to the oil so obtained a minor amount of an organic polar compound capable of facilitating the bodying of said fatty oil and of modifying the physical and other properties of the same, said polar compound being maleic anhydride, and further heating the mixture at an elevated temperature until the organic polar compound is dissolved and a modified heat-bodied oil product is obtained, the amount of said organic polar compound being sufficient to substantially modify the physical properties of the oil so obtained.

11. The process of claim 10, wherein a fatty oil other than castor oil is added to the reaction mixture.

12. The process of claim 10, wherein a fatty oil other than castor oil is added to the reaction mixture and said reaction mixture is further heated at polymerizing temperatures.

LÁSZLÓ AUER.